Feb. 13, 1968    C. SCHRÖTER ET AL    3,368,931

DEVICE FOR MOUNTING TRANSPARENCIES

Filed Aug. 28, 1964

INVENTORS:
Carl Schröter
Heiko Hortmeyer

BY  Mestern, Ross & Mestern

3,368,931
DEVICE FOR MOUNTING TRANSPARENCIES
Carl Schröter, Schmiden, Wurttemberg, and Heiko Hortmeyer, Wuppertal-Elberfeld, Germany, assignors to Heinrich Hermann, Stuttgart-Wangen, Germany, a corporation of Germany
Filed Aug. 28, 1964, Ser. No. 392,792
Claims priority, application Germany, Sept. 5, 1963,
H 50,193
8 Claims. (Cl. 156—479)

The present invention relates to a device for the mounting of transparencies and, more particularly, to an improved device of this character wherein a pair of transparent cover members (e.g. glass plates) sandwich between them a film transparency or diapositive and are held together by a transparency-binder frame, whose flaps are turned over the edges of the glass plates and are fixed in place while the binder frame is provided with a window through which the transparency can be viewed or projected.

Projection or lantern slides have generally been prepared heretofore by either sandwiching a transparency between a pair of frame members which are joined together along the periphery of the transparency by thermally sensitive or pressure (e.g. contact) adhesives or by placing the transparency between a pair of glass cover members and then binding the edges of these cover members with a tape or the like. Lantern slides of the latter type are, however, difficult to assemble because the application of binder tapes frequently results in a dislocation of the transparency or an offsetting of one of the glass cover members with respect to the other or to the frame. In a commonly assigned copending application Ser. No. 209,180, filed July 11, 1962, by Heiko Hortmeyer and Carl Schröter, and now U.S. Ptatent No. 3,205,115 there is disclosed a method of mounting transparencies and a device for carrying out this method whereby, instead of a binder tape, a flexible transparency-binder frame is provided. This generally rectangular frame has a window through which the transparency is exposed for viewing or projection and four lateral flaps which are bent around the edges of the glass cover members and are secured by an adhesive to the surface of the glass member remote from that on which the window is provided. This arrangement has considerable advantages over the earlier systems and is principally characterized by the fact that shifting of the transparency between the two cover members or shifting of one of the cover members with respect to the other can be prevented.

The device according to this earlier, commonly owned copending application generally comprises a base formed with a recess and a frame-support plate mounted in the recess for displacement therein between a first position wherein the surface of the plate is disposed above the periphery of the recess and a second position wherein the surface is disposed below the recess periphery whereby flaps of a transparency-binder frame are deflected around the edges of a pair of superimposed transparent cover members forming a sandwich assembly with the transparency between them. In addition, means are provided for positioning the cover members with respect to one another and a transparency-binder frame disposed on the surface of the frame-support plate. Such means can include another plate mounted on the frame-support plate in an opening therein and normally projecting therefrom so that this receiving plate passes through a central window of the transparency-binder frame and carries the cover members with the transparency disposed between them. This arrangement is particularly important when the transparency-binder frame is provided with a layer of a pressure-sensitive adhesive. The cover members are disposed upon the other or receiving plate and then brought into contact with the transparency-binder frame by the operator who, with his fingers, depresses the receiving plate; further manual depression of the assembly results in the flaps of the binder frame being deflected around the edges of the cover members and enables these flaps to be brought into contact with the upper cover member along the side thereof remote from the transparency. The pressure-sensitive adhesive is thus effective to bond the major part of the frame to one side of one cover member and the flaps of the frame to the opposite side of the other cover member, thereby binding all of the edges of the two members while securing them in these proper positions. The mounting of a transparency is thus relatively rapid and simple and does not require extensive manipulation to prevent shifting of any of the component parts. The device, moreover, includes guide means for centering the cover glasses on the second or receiving plate. The improved device eliminates the need for drawing the transparency between the cover plates and thereby obviates the principal disadvantages of such systems, namely the scratching and scraping of the transparency which previously characterized such systems. Furthermore, the new method and device eliminate the requirement that the assembly have at least one open side through which the transparency can be inserted and thus remove another disadvantage, i.e. the possibility that dirt and other contaminants will fined their way between the plates. In one respect, however, the improved system described in application Ser. No. 209,180 may be somewhat disadvantageous; it is frequently desirable that the front face of the transparency-binder frame carry legible matter or a region in which it may be appropriate to apply legible matter descriptive of subject matter of the transparency. In this case, it is difficult, after the transparency-binder frame has been placed face down upon the surface of the frame-support plate, to determine the location of this region or the orientation of any previously applied legible matter. This difficulty arises when the second or cover-member receiving plate is rectangular and adapted to fit into a rectangular window of the transparency-binder frame. The binder frame can then have two orientations on the support plate in which the receiving plate can pass through the opening. The problem is even more acute when both the window and the receiving plate are of square configuration. In this case there are four orientations of the transparency-binder frame which will permit it to rest properly upon the frame-support plate.

It is the principal object of the present invention to provide a device for the mounting of transparencies between a pair of cover members which will obviate these latter disadvantages.

Another object of this invention is to provide a device of the character described which constitutes an improvement over that disclosed and claimed in application Ser. No. 209,180.

These objects and others which will become apparent hereinafter are attained, in accordance with the present invention, by providing a device of the general type described, namely one in which a frame-support plate is mounted in a recess of the base in such manner that the flaps of a transparency-binder frame are deflected around the edges of the transparent cover member, wherein registeing means is povided on the fame-suppot plate and engages the transparency-binder frame in such manner that the latter can be received upon the frame-support plate in only a single operative position of the frame. This registering means, according to the invention, includes a projecting formation engaging a complementary formation on the binder frame. This formation is preferably a semicircular projection along the circumference of the second or cover-member receiving plate, the semicircular projection being received in a semicircular niche provided along the circumference of the central window of the transparency-binder frame. When this other plate and the window are of rectangular configuration (e.g. square), the formations must be offset from a line of symmetry of the rectangle. A "line of symmetry" of the rectangle will be understood to be any of the diagonals thereof or lines passing through the center of the rectangle and bisecting opposite sides. The nose-like semicircular projection and complementary niche can then be located along any side of the rectangle between the vertices thereof and the midpoint of the side.

The above and other objects, features and advantages of the present invention will become more readily apparent from the following description, reference being made to the accompanying drawing in which.

Figure 3:
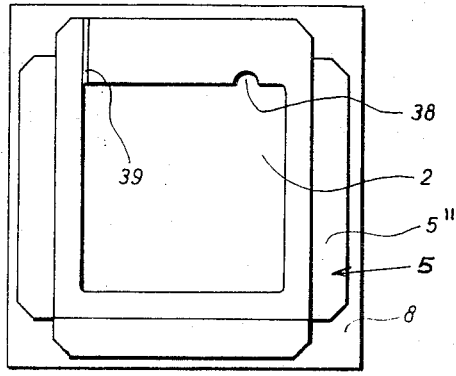
FIG. 3 is a plan view of a transparency binder frame prior to the removal of the adhesive-masking foil.

In the drawing, there is shown a box-like base 17, preferably composed of plastic, resting upon legs 17' of rubber and open downwardly. In a recess 18 of this base, the frame-support plate 19 is vertically displaceable, i.e. in a direction perpendicular to its receiving surface 29 upon which a transparency-binder frame 5 can be disposed. The plate 19 is biased upwardly by four compression springs 21 at the corners of this plate, these springs 21 being held in place by respective abutments 21', 21" of the base 17 and the plate 19, respectively. The plate 19 is integral with a boss 20 which passes through the floor 18' of recess 18 and carries an abutment ring 22 limiting the vertical displacement of the plate 19.

Figure 1:
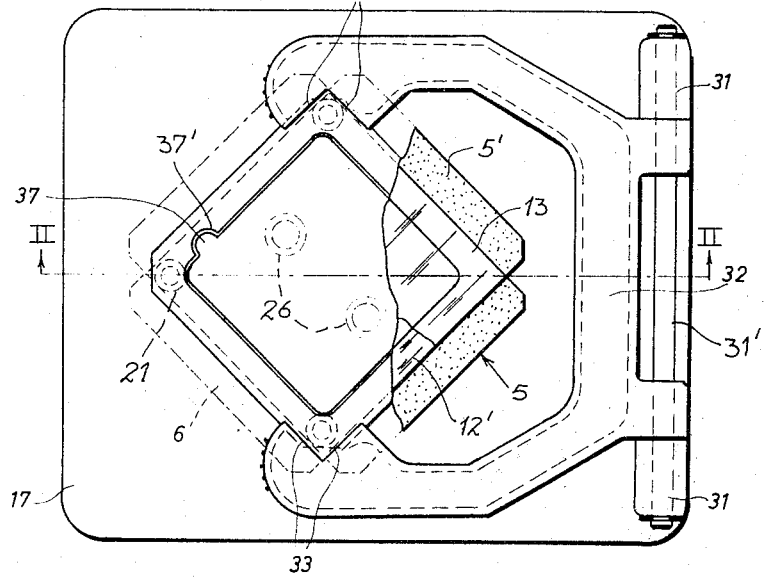
FIG. 1 is a plan view of a device for mounting transparencies, according to the present invention.

An opening 23 in the frame-support plate 19 receives a second plate 24 adapted to carry the cover members 12, 13 with the transparency 12' sandwiched between them. The second plate 24 is vertically shiftable against compression springs 26 (two of which are provided as is evident from FIG. 1 although only one can be seen in FIG. 2). The plate 24 has a pin passing through the tubular boss 20 and carrying an abutment ring 24" limiting the vertical displacement of plate 24 under the force of springs 26. Plate 24 is dimensioned so as to pass through the window 2 of the frame 5 and thus has a configuration similar to that of the window.

Figure 2:
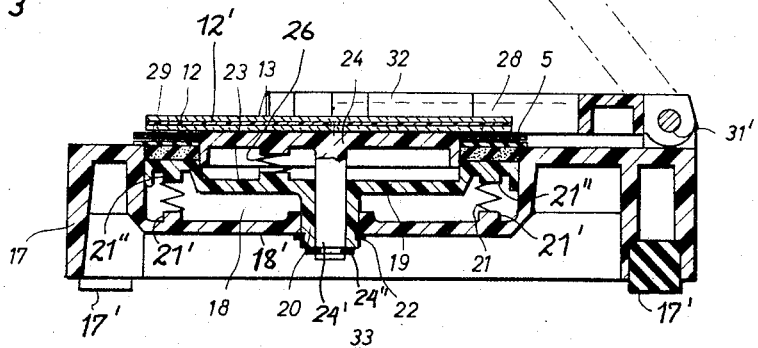
FIG. 2 is a cross-sectional view taken along the line II—II of FIG. 1.

As described in the aforementioned commonly owned copending application, the frame-support plate 19 has its receiving surface formed by a rectangular rubber sheet 29 whose edges can project limitedly over the edges of recess 18 as will best be seen in FIG. 2. Sheet 29 is mounted upon a resiliently compressible layer 28 (e.g. of foam rubber). To permit disposition of the frame 5 upon the surface 29 of plate 19 in only a single position, thereby eliminating any difficulties arising from a plurality of orientations of the frame, the carrier plate 24 is provided along of its lateral edges with a nose-like projecting formation 37. The projection 37 passes with clearance through complementary cutouts 37' in the surface 29 and the underlying layer 28 of plate 19 so as to enable plate 24 to be displaced downwardly relative to plate 19. The lateral projection 37 serves as a registering means permitting the frame to be disposed on the receiving surface 29 of the plate 19 in only a single operative position of the frame. As best seen in FIG. 3, the frame 5 is provided with a complementary niche 38 at a corresponding location, this niche receiving the projection 37 and registering therewith when the frame 5 is disposed upon plate 19. The frame 5 can be composed of flexible material and preferably conforms to the German Industrial Standard (DIN) A 37.

As previously indicated, the frame 5 can be provided with a square window 2 so that different transparency sizes can be accommodated. When the frame window is larger than the field of view of the transparency, the perforations thereof can be masked by a conventional apertured and opaque framing or masking member. In this case both the mask and the transparency are received between the glass plates.

To facilitate sorting of the completed transparencies in a container, one frame-member side can be provided with further markings in addition to the legible matter previously mentioned. This further marking can be in the form of one or more clear or light-color stripes 39 on a dark base. The frame 5 has its back surface provided with a pressure-sensitive (contact) adhesive 5' (FIG. 1), which is covered by a protective foil or masking layer 8. Prior to use, this masking layer 8 is stripped from the frame so that the flaps 5" of the frame can be bent around the edges of the glass members 12 and 13. The recess 18 is so arranged in the base 17 that a diagonal of the recess extends in the longitudinal axis of the base 17. This axis lies in the plane designated by the secion line II—II. Along a transverse edge of the base 17, there are provided two integral trunnions 31 between which a bifurcated arm or yoke 32 is journaled by a pintle 31'. The arms of the guide member 32 are provided with right-angle vertical grooves 33 by means of which the cover glasses 12 and 13 can be guided by their corners onto the plate 24. When the member 32 is in its raised position (dot-dash lines in FIG. 2) the transparency-binder frame 5 can be disposed upon plate 19.

With the member 32 in its raised position, a frame 5 from which the masking foil 8 has been stripped, is disposed upon the surface 29 of plate 19 with its adhesive side upward and its legible-matter side face down on this plate. The frame 5 can only be so disposed when its niche 38 is properly registered with the nose-like projection 37. Member 32 of the guide means is then brought down and is in position to receive first the lower glass plate 12, then a transparency 12' (with or without a masking member) and then the upper glass plate 13. While both glass cover members 12, 13 are pressed lightly downwardly on the shiftable plate 24 by the operator's fingers, the guide member 32 can be raised to an upper position (dot-dash lines) whereupon the manually applied pressure on the cover glasses can be increased. The lower glass plate 12 then comes into contact with the adhesive surface of frame 5 and, as plate 19 is depressed, the flaps 5" of frame 5 are deflected upwardly as the outermost portions of the rubber layer 29 are deflected upwardly by the periphery of recess 18. The edges of the glass plates are now surrounded by the flaps 5", which can be bent over onto the rear surface of glass plate 13 and thereby adhered to the reverse side of the assembly. After the flaps are manually applied to the upper glass plate 13, pressure on the assembly is released and springs 21 and 26 urge the plates 19 and 24 upwardly so that plate 24 lifts the completed lantern or projection slide out of the recess 18 to facilitate its removal from the device. The process can then be repeated.

The invention described and illustrated is believed to admit of many modifications within the ability of persons skilled in the art, all such modifications being considered within the spirit and scope of the appended claims.

What is claimed is:

1. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and means for positioning said cover members with said transparency between them on said transparency-binder frame, the improvement which comprises registering means on said frame-support plate engaging said transparency-binder frame for receiving the latter in only a single operative position of said frame.

2. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and means for positioning said cover members with said transparency between them on said transparency-binder frame, the improvement which comprises registering means including a projecting formation on said frame-support plate engaging a complementary formation on said transparency-binder frame for receiving the latter in only a single operative position of said frame.

3. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and another plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means on said other plate engaging said transparency-binder frame for permitting the latter to be disposed on said surface in only a single operative position of said frame.

4. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and another plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means including a projecting formation along the circumference of said other plate engaging a complementary formation of said transparency-binder frame along the circumference of said window for permitting said frame to be disposed on said surface in only a single operative position of said frame.

5. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and another plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means including a projecting formation along the circumference of said other plate engaging a complementary formation of said transparency-binder frame along the circumference of said window for permitting said frame to be disposed on said surface in only a single operative position of said frame, said frame-support plate having an opening receiving said other plate and being formed along the circumference of said opening with a cut-out adapted to clear said projecting formation.

6. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent coverd members sandwiching a transparency between them, and a rectangular other plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means including a projecting formation along a side of said other plate engaging a complementary formation of said transparency-binder frame along the circumference of said window for permitting said frame to be disposed on said surface in only a single operative position of said frame, said formations being offset from a line of symmetry of the rectangular other plate.

7. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and a rectangular other plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means including a lateral semicircular projection along a side of said other plate engaging a complementary semicircular niche of said transparency-binder frame along the circumference of said window for permitting said frame to be disposed on said surface in only a single operative position of said frame, said projection being offset from a line of symmetry of the rectangular other plate.

8. In a device for mounting transparencies, comprising a base formed with a recess, a frame-support plate mounted in said recess for displacement therein between a first position wherein the surface of said plate is disposed above the periphery of said recess and a second position wherein said surface is disposed below said periphery whereby flaps of a transparency-binder frame are deflected around the edges of a pair of transparent cover members sandwiching a transparency between them, and a rectangular other plate mounted on said frame-support plate and adapted to pass through a central window of said transparency-binder frame for carrying said cover members with said transparency between them, said other plate being displaceable in a direction perpendicular to said surface and in the direction of displacement of said frame-support plate for enabling said cover members to rest upon said transparency-binder frame, the improvement which comprises registering means including a lateral semicircular projection along a side of said other plate engaging a complementary semicircular niche of said transparency-binder frame along the circumference of said window for permitting said frame to be disposed on said surface in only a single operative position of said frame, said projection being offset from a line of symmetry of the rectangular other plate, said frame-support plate having an opening receiving said other plate and being formed along the circumference of said opening with a cut-out adapted to clear said projection.

References Cited

UNITED STATES PATENTS

| | | | |
|---|---|---|---|
| 2,164,655 | 7/1939 | Kleerup | 156—493 XR |
| 2,302,561 | 11/1942 | Libby et al. | 156—514 |

EARL M. BERGERT, *Primary Examiner.*

H. F. EPSTEIN, *Assistant Examiner.*